United States Patent [19]
Swogger

[11] 3,823,729
[45] July 16, 1974

[54] DIFFERENTIAL PRESSURE MONITORING VALVE

[75] Inventor: Emery C. Swogger, Arlington, Tex.

[73] Assignee: LTV Aerospace Corporation, Dallas, Tex.

[22] Filed: May 7, 1973

[21] Appl. No.: 357,984

[52] U.S. Cl................................. 137/100, 137/118
[51] Int. Cl...................... G05d 11/00, F16k 11/07
[58] Field of Search..................... 137/100, 115, 118

[56] References Cited
UNITED STATES PATENTS

| | | | |
|---|---|---|---|
| 3,519,010 | 7/1970 | Helling et al. | 137/100 |
| 3,685,531 | 8/1972 | Byford | 137/100 X |
| 3,742,970 | 7/1973 | Gross | 137/100 |
| 3,771,543 | 11/1973 | Wiggins | 137/100 |

Primary Examiner—William R. Cline
Attorney, Agent, or Firm—J. M. Cate; H. C. Goldwire

[57] ABSTRACT

A fluid control valve of a type operable to shut off fluid flow through the valve upon the occurrence of a pressure differential above a predetermined level between two portions of a fluid system. A valve member is slidably mounted within a valve chamber and movable therein within first, second, third, fourth, and fifth positional ranges. The valve member has a passageway which provides communication through the valve between first and second ports for providing fluid flow therebetween upon the valve member being positioned within its third positional range, and also has valving means for shutting off fluid flow upon the valve member being positioned within its first or its fifth positional ranges.

18 Claims, 4 Drawing Figures

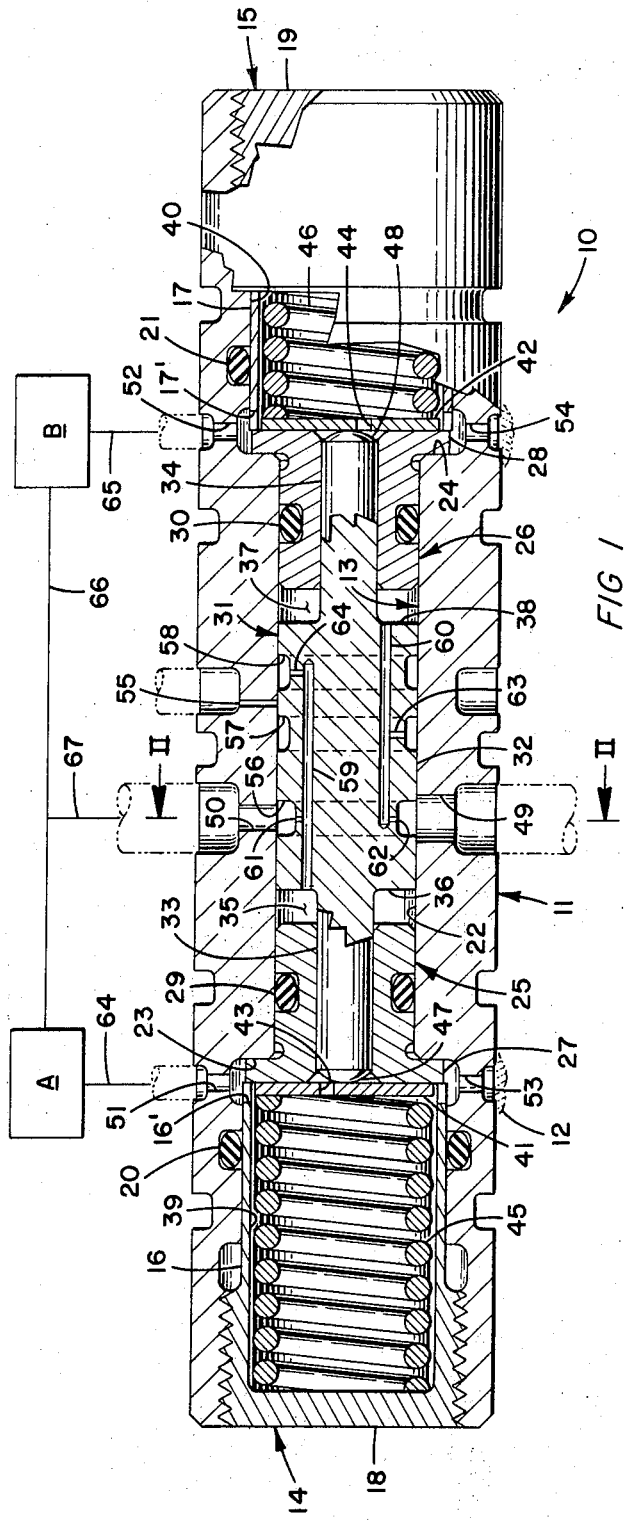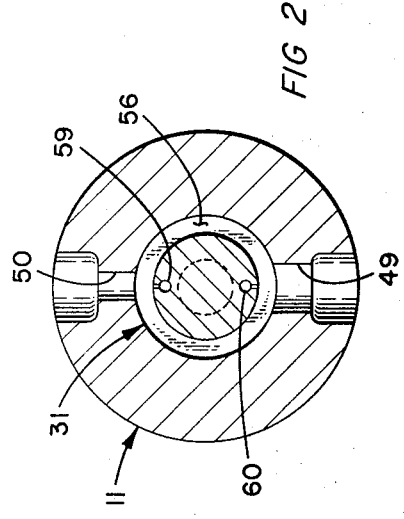

DIFFERENTIAL PRESSURE MONITORING VALVE

This invention relates to fluid control valves and, more particularly, to a fluid control valve operable for monitoring pressure differential between two portions of a fluid system and for shutting off fluid flow through the valve upon the occurrence of a pressure differential above a predetermined level.

Fluid control and monitoring valves responsive to differences in pressure between two portions of a hydraulic system and operative to actuate various types of control valves, warning devices, or the like when unacceptable levels of pressure differential occur are known in the art. Some of these monitoring valves incorporate rather complex, undesirably fragile, electrical sensing and/or switching components. Others comprise hydro-mechanical devices for actuating a control valve for terminating fluid flow to non-operative segments of redundant, fluid control circuits. It is desirable, of course, that such monitoring devices and control valves be of rugged, reliable construction, and that the number of moving parts be minimized. Moreover, a need exists for a compact monitoring valve which itself includes means operable to shut off fluid flow from a source of fluid under pressure to a malfunctioning segment of a hydraulic network, wherein the valve is actuated by fluid pressure from the source of fluid under pressure, and wherein the valve automatically returns to a fluid conducting mode if the supply of fluid under pressure to the valve is interrupted.

It is, therefore, a major object of the present invention to provide a valve for continuously monitoring the difference in pressure between two segments of a fluid system and for shutting off fluid flow through the valve from a source of fluid under pressure upon the occurrence of a difference in pressure which exceeds a predetermined limit.

Another object is to provide such a valve in which both the monitoring and the valving functions are accomplished within a single, compact unit.

A further object is to provide such a valve having only one movable valve element.

Yet another object is to provide such a monitoring valve which is of rugged, durable construction and which is thus suited for use in control systems for aircraft, space vehicles, and the like wherein reliability is of critical importance.

Other objects and advantages will be apparent from the specification and claims and from the accompanying drawing illustrative of the invention. While a preferred embodiment, along with modifications thereof, will be described in detail, it should be understood that various other modifications and applications of the valve may be made without departing from the scope of the invention. While the valve will be described herein with reference to its use in a hydraulic control system, it is also suited for use in pneumatic systems.

In the drawing:

FIG. 1 is a longitudinal, sectional view of a preferred embodiment of the valve along with a diagrammatic representation of associated components, the valve member being shown in its third position;

FIG. 2 is a cross-sectional view of the valve taken as on line II—II of FIG. 1;

Figure 3:
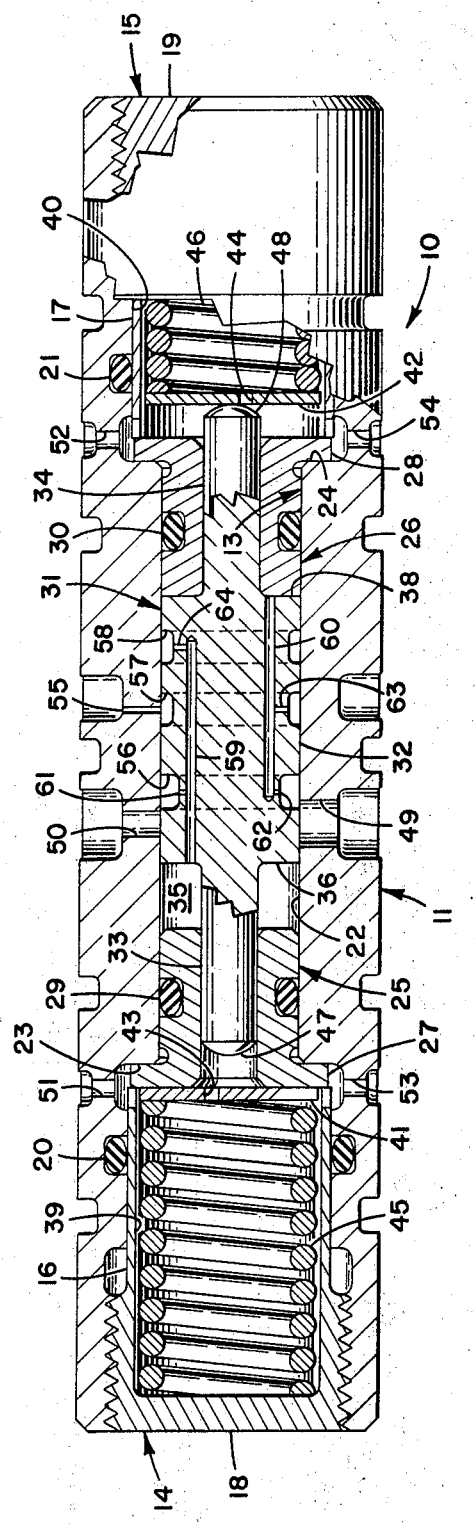
FIG. 3 is a view, similar to FIG. 1, showing the valve member in its fifth position.

Referring now to FIG. 1, a valve 10 constructed according to a preferred embodiment of the invention includes a cylindrical, tubular valve housing 11 of the type adapted to be sealingly inserted within a corresponding cavity formed within an outer, systems housing, fragments of which are shown at 12. The present, illustrative embodiment of the valve 10 is of the type having ports, to be described, positioned along the valve housing 11 in a pattern which corresponds to that of corresponding passageways, also to be described, formed within the outer, systems housing 12, whereby the valve 10 may be removed from the outer housing 12 for maintenance or as otherwise required, according to practices known in the art.

With continued reference to FIG. 1, the valve housing 11 has a channel or chamber 13 extending axially therethrough. First and second, generally cup-shaped plug members 14, 15 are threadingly engaged with the valve housing 11 wihtin opposite end portions of the chamber 13 and serve to close the respective end portions. The plug members 14, 15 each include a respective, cylindrical sidewall portion 16, 17 extending centrally within the housing chamber 13 from respective, base wall portions 18, 19 extending transversely of the sidewall portions 16, 17 and of the valve housing chamber 13. Each of the plug member sidewalls 16, 17 is externally threaded along a portion of its length which portion is adjacent the respective base wall portion 18, 19, the remaining portion having a smooth-surfaced, cylindrical outer surface. The central end portions of the cup member sidewalls 16, 17 are notched, at 16' and 17', to permit communication between the interiors of the cup members 14, 15 and the ports 51, 52, respectively, to be described hereinbelow. First and second O-ring seals 20, 21 are seated within corresponding, annular recesses formed coaxially of the valve housing and within the housing inner wall defining the chamber 13, the recesses and seals 20, 21 being positioned circumferentially around the smooth-surfaced portions of the respective, adjacent sidewalls 16, 17 of the first and second plug members 14, 15 upon the plug members 14, 15 being mounted within the chamber 13, the seals 20, 21 being configured to provide a fluid-sealed relationship between the housing 11 and the respective plug members 14, 15.

The portions of the housing chamber 13 within which the plug members 14, 15 extend are preferably of a greater diameter than the remaining, central portion extending between them, the central portion being defined by a central, cylindrical wall portion 22 of reduced diameter. First and second, annular shoulders 23, 24 extending radially outwardly from the central cylindrical wall portion 22 are thus defined adjacent the respective ends of the central wall portion 22.

First and second, tubular bushings 25, 26 are fixedly seated within the central wall portion 22 of the chamber 13, the bushings 25, 26 having respective, radially outwardly extending head portions 27, 28 disposed adjacent but external the central, cylindrical wall portion 22 and seated against the first and second annular shoulders 23, 24 respectively. The respective surfaces of the bushing head portions 27, 28 facing outwardly of the central wall portion 22 are substantially flat, and extend transversely with respect to the longitudinal axis of chamber 13. Third and fourth, O-ring seals 29, 30 are seated within corresponding, annular recesses formed circumferentially of the first and second bushings 25, 26 respectively, and are positioned in sealing association with the central wall portion 22 for ensuring fluid tight seals between the bushings 25, 26 and the housing 11.

A spool type valve member 31 is slidably mounted within the chamber 13, the valve member having a central, spool portion 32 which is machined to provide sliding and substantially sealing association between the outer, cylindrical surface of the spool portion 32 and the central, inner wall portion 22 of the housing 11. The valve member 31 additionally has first and second, substantially cylindrical plungers 33, 34 coaxial of the spool portion 32, projecting outwardly from respective, opposite end portions of the spool portion 32, and extending coaxially within the first and second, tubular bushings 25, 26, respectively. The first and second plungers 33, 34 are machined to fit sealingly and slidingly within the first and second bushings 25, 26 and, in cooperation with the bushings and the third and fourth O-ring seals 29, 30, are thus effective to isolate the portion of the chamber 13 extending between the two bushings 25, 26 from the remaining portions disposed beyond the bushings. Thus, a first, annular, chamber portion 35 is defined between the first bushing 25 and the valve member spool 32, the spool 32 having a first, annular piston face area 36 defining one side of the first chamber portion 35 and facing in a first axial direction or toward the first bushing 25. Similarly, a second, annular, chamber portion 37 is formed between the second bushing 26 and the valve member. The spool 32 has a second, annular, piston face area 38 defining one side of the second chamber portion 37 and facing in a second axial direction or toward the second bushing 26.

Third and fourth chamber portions 39, 40 are formed in the portions of the chamber 13 beyond the bushings 25, 26, the third chamber portion 39 extending from the first bushing 25 to the base wall 18 of the first plug member 14 and the fourth chamber portion 40 extending from the second bushing 26 to the base wall 19 of the second plug member 15.

Within the third and fourth chamber portions 39, 40 are positioned first and second disc members 41, 42, each of a slightly smaller diameter than the inner diameter of the corresponding, adjacent plug member 14, 15, respectively, and each positioned in abutting relationship with the flat, outwardly facing base surface of the respective, adjacent, bushing head portion 27, 28. The first and second disc members 41, 42 have respective central or channels 43, 44 formed therethrough for providing communication between the third and fourth chamber portions 39, 40 and the first and second plungers 33 and 34, respectively. A first coiled spring 45 extends within the third chamber portion, axially of the first plug member 14, and has one end footed against the base wall 18 of the plug member and another end footed against the first disc member 41 to partially compress the spring. A second coiled spring 46 is similarly mounted within the fourth chamber portion 40 and footed between the second disc member 42 and the base wall 19 of the second plug member 15. The first and second coiled springs 45, 46 are of equal spring rates and are compressed by substantially equal amounts, whereby the valve member 31 tends to remain in its centered position provided the springs are not overcome by other forces urging the valve member axially.

Third and fourth piston face areas 47, 48 are defined by the distal end surfaces of the first and second plungers 33, 34, the piston face areas 47, 48 facing in the first and second directions, respectively, and contacting the first and second disc members 41, 42, respectively, upon the disc members abutting against the first and second bushings 27, 28, respectively.

The valve 10 is provided with a first, or inlet port 49 extending through the housing 11 and a second, or outlet port 50 extending through the housing, the inlet and outlet ports suitably being coaxially aligned and bisected by a plane perpendicular to the longitudinal axis of the valve housing 11.

Third and fourth ports 51, 52 are also formed through the housing 11 adjacent the head portions 27, 28 of the first and second bushings 25, 26, respectively, the third and fourth ports 51, 52 having communication with the third and fourth chamber portions 39, 40, respectively. In the present embodiment, the third and fourth ports 51, 52 are duplicated by redundant ports 53, 54 positioned diametrically opposite the third and fourth ports 51, 52, respectively. The ports 51, 53 and the ports 52, 51 communicate radially outwardly with respective grooves extending circumferentially around the housing 11, and the redundant ports 53, 54 thus serve to enhance fluid communication between the chambers 39, 40 and the outer, circumferential grooves. In the present embodiment, these circumferential grooves are covered by adjacent portions of the outer, system housing 12 at all portions thereof except the areas adjacent ports 51, 52, at which communication is provided with passageways 64, 65, to be discussed hereinbelow.

The housing 11 additionally has at least one drain opening 55 formed therethrough and having communication with the chamber 13 at a location along the housing 11 spaced between the second port 50 and the fourth port 52.

First, second, and third annular grooves or annuli 56, 57, 58 are formed circumferentially of the valve spool portion 32, the first, second, and third annuli being spaced successively along the spool 32 in the second direction, or rightwardly as viewed in FIGS. 1 and 3.

Upon the valve member 31 being positioned with its first and second plungers 33, 34 in contact with the first and second disc members 41, 42, respectively, the disc members 41, 42 are in contact with the first and second bushings 25, 26, respectively, and the spool portion 32 is centrally located between the first and second bushings. When the valve 31 is in its centered position, the first annulus 56 is aligned with the first and second ports 49, 50 and thus provides communication therebetween. For reasons which will become apparent, the first port 49 is of a diameter greater than the width of the first annulus 56, and the width of the first annulus 56 is greater than the diameter of the second port 50.

A first axial bore 59 extends axially within the spool portion 32, the first axial bore 59 having communication with the first chamber portion 35 and extending, from the first, annular piston face area 36 and in the second direction, within the spool 32 to a location adjacent the third annulus 58. Similarly, a second axial bore 60 extends, in the opposite direction, from the second piston face area 38 to a location within the spool 32 adjacent the first annulus 56.

First and second restrictive passageways 61, 62 communicate between the first annulus 56 and the first and second axial bores 59, 60, respectively. Similarly, a third passageway 63 communicates between the second axial bore 60 and the second annulus 57, and a fourth passageway 64 communicates between the first axial bore 59 and the third annulus 58.

The valve member 31 is axially slidable within the chamber 13 from a position in which its first annular piston face 36 seats against the first bushing 25 to a position, as shown in FIG. 3, in which its second, annular piston face 38 seats against the second bushing 26. For clarity of reference, the above-noted range of movement of the valve member 31 is divided into five positional ranges, consecutive in the second direction or from left to right, as will now be described. In its central, or third positional range, the first annulus 56 is in communication with the first and second ports 49, 50 and thus comprises a passageway communicating between the ports 49, 50. When the valve member spool 32 is centered between the first and second bushings 25, 26, the portion of the spool 32 extending between the second and third annuli 57, 58 is disposed in register with the drain opening 55 and serves to close the drain opening, thus to prevent any loss of fluid through the drain opening 55. Upon the valve member 31 moving in the first (left) direction, the third annulus 58 becomes in register with the drain opening 55. The first and third annuli 56, 58 are positioned in sufficiently close relationship, relative to the spacing and size of the second port 50 and the drain opening 55, to permit the complete closure of the second port 50 by the portion of the spool 32 between the first annulus and the first annular piston face 36 when the valve member is moved in the second direction to the extreme rightward position shown in FIG. 3.

The fourth positional range is defined as that range of positions beginning, as the valve member 32 is moved in the second direction from its third positional range, when the second annulus 57 initially communicates freely with the drain opening 55 and ending when the second port 50 is completely closed by the portion of the spool extending between the first annulus 56 and the first piston face 36. The fifth positional range extends from the latter position to that shown in FIG. 3 wherein the second piston face area 38 of the spool 32 contacts the second bushing 26.

The first port 49 is sufficiently wider than the first annulus 56 to permit some communication therebetween during all relative positions of the valve member 31, even, for example, in the position shown in FIG. 3 wherein the spool 32 abuts against the second bushing 26; similarly, there remains an opening between the first port 49 and the first annulus 56 upon the valve member being moved in the opposite axial direction until the first piston face 36 contacts the first bushing 25.

The second and first positional ranges are defined similarly, but with respect to movement of the spool 32 in the first direction from its third positional range. As the valve member 31 is moved in the first direction through its third positional range, the portion of the spool 32 extending between the second and third annuli 57, 58 remains in covering relationship with the drain opening 55. The second positional range is defined as that range beginning, as the valve member 31 is moved in the first direction from its third positional range, when the third annulus 58 first communicates freely with the drain opening 55 and ending when the second port 50 is completely closed, by the portion of the spool 32 extending between the first and second annuli 56, 57. The first positional range is defined as that beginning at the latter position, wherein the second port 50 is first closed by the spool 32, and ending as the valve 31 is stopped from further movement in the first direction by contact of the first piston face 36 with the first bushing 25.

The valve 10 is thus operable to conduct fluid, from a source, not shown, of fluid under pressure communicating with the first orifice 49, through the first annulus 56 and the second port 50 when the valve member 31 is in its second, third, or fourth positional ranges. As will be described in the paragraphs to follow, the valve 10 is operable to shut off fluid flow therethrough upon the occurrence of a predetermined pressure differential between first and second portions of a fluid system, represented diagrammatically by blocks "A" and "B," respectively.

A passageway or conduit 64 communicates between the third port 51 and fluid system portion A, and a conduit 65 communicates between the fourth port 52 and fluid system portion B. In the illustrative embodiment of FIGS. 1–3, a conduit 66 communicates between the two fluid system portions A and B, and a conduit 67 communicates between the second port 50 and conduit 66. The illustrative embodiment thus represents a fluid system in which fluid under pressure flows through the valve 10, via conduits 67 and 66, to the two fluid system portions A and B. The system of FIG. 1 is intended to show broadly one exemplary application of the valve 10. Such a system corresponds, for example, to a water supply system wherein water is conducted through the valve 10 to two system portions A and B, and wherein it is desired to shut off fluid flow to both portions upon the existence an abnormal pressure differential between the two portions. Another application is in a fluid system, not shown, in which a differential pressure and/or flow producing device, i.e. an electro-hydraulic servo valve, is used to produce a differential pressure across a piston face wherein it is desired to shut off flow to the device upon the occurrence of a predetermined pressure differential, indicative of an abnormal condition.

The operation of the valve will initially be described with reference to FIG. 1 wherein the valve member 31 is centered within its third positional range. In the description to follow, the movement of the valve member 31 will be described in terms of leftward and rightward movement with reference to the drawing, it being understood that such terminology is employed for clarity of description only and is not meant to limit the valve to a particular configuration or orientation. When the valve member 31 is in its third positional range, fluid flow is permitted from the first to the second ports 49, 50, and from thence through conduits 67 and 66 to fluid system portions A and B. The fluid pressure existing within fluid system portion A is transmitted, via conduit 64 and the third port 51 and through the notched portion 16' of the plug member sidewall 16, to the third chamber portion 39, within the first plug member 14. Similarly, fluid pressure within the fluid system portion B is transmitted through conduit 65 and fourth port 52 to the fourth chamber portion 40. Fluid pressure within the third chamber portion 39 is applied to the third piston face area 47, of the first plunger 33, through the opening 43 in the disc member 41. Correspondingly, fluid pressure within the fourth chamber portion 40 exerts a pressure upon the fourth piston face area 48, of the second plunger 34. Because the third and fourth piston face areas 47, 48 are of equal area, it will be apparent that there will be no net force tending to move the piston member 31 axially when equal pressures exist within the third and fourth chamber portions 39, 40. Moreover, the first and second coil springs 45, 46 act to continuously urge the valve member 31 toward its centered position as shown in FIG. 1. Upon the occurrence of a drop in pressure in fluid system portion B whereby the pressure within portion B drops below that of portion A, however, the pressure differential between portions A and B will be transmitted to the third and fourth ports 51, 52 and will result in a drop in pressure within the fourth chamber portion 40 relative to the pressure within the third chamber portion 39. The differential pressure thus effected within the valve 10 exerts a net force upon the valve member 31 tending to urge it to the right. Any forces tending to move the valve member 31 from its centered position are resisted by one of the first and second springs 45, 46, so that insignificant variances in pressure between fluid system portions A and B do not cause any movement of the valve member 31. Assuming, however, that the loss in fluid pressure within portion B causes a net fluid pressure differential resulting in a force which is greater than the resistance to rightward movement of the valve member 31 caused by the second spring 46, fluid pressure will then begin to translate the valve member 31 to the right. As the valve member 31 moves to the right, fluid within the second, annular chamber portion 37 is caused to flow therefrom and successively through the second axial bore 60, the second restrictive passageway 62, the first annulus 56, the first restrictive passageway 61, and the first axial bore 59, to the first, annular chamber portion 35, the restrictive passageways 61, 62 and the bores 60, 59 thus serving frictionally to resist movement of the valve member 31 with a force proportional to the rate of movement thereof. The bores 59, 60 and the passageways 61, 62, in combination with the first and second chamber portions 35, 37 thus comprise means for preventing movement of the valve member 31 from its third positional range upon the occurrence of transient differential pressures between the third and fourth ports 51, 52 of a level above a predetermined level at which movement of the valve member 31 from its third positional range would ultimately occur but of a duration less than a predetermined time period, for a given pressure level.

Assuming that a substantial, non-transient pressure differential exists which is of a level sufficient to move the valve member 31 to the right against the opposing force of the second spring 46, the valve member 31 then translates to the right, further compressing the spring 46. If the differential pressure is of a value less than the predetermined level at which shut-off of fluid flow is desired, an equilibrium condition will be reached before the valve member 31 leaves its third positional range because of the increased force exerted, at the equilibrium position, by the more fully compressed, second spring 46. If the differential pressure is above the predetermined level, however, the valve member 31 will be translated rightwardly to the fourth positional range (in which the second annulus 57 registers and communicates with the drain opening 55; upon the valve member 31 thus entering the fourth positional range, fluid pressure within the second, annular chamber portion 37 is significantly reduced by the passage of fluid from chamber portion 37 through the second axial bore 60, the third restrictive passageway 63, the second annulus 57, and through the drain opening 55. It will be noted that no such drainage outlet is opened to the first cavity 35, in that the third annulus 58 is then closed by the surrounding wall of the valve housing 11. Both annular chamber portions 35, 37 receive fluid under pressure from the first port 49 through the first annulus 56 and respective ones of the axial bores 59, 60. However, the reduction of pressure within the second chamber portion 37 by fluid flow therefrom through the drainage opening 55 induces a substantial net force upon the valve member 31 serving to urge the valve member 31 to the right through the remainder of the fourth positional range and into the fifth positional range, in which the portion of the spool 32 extending between the first annulus 56 and the first, annular piston face area 36 covers the second port 50 and prevents further passage of fluid therethrough. Upon the second port 50 being closed, fluid entering the valve 10 through its first port 49 continues to exert a net force on the valve member 31 urging it to the right, and the valve member 31 is translated to the right until it is stopped by contact of the second piston face 38 with the second bushing 26.

The valve 10 thus remains closed so long as fluid under pressure is received through the first port 49. Upon the excessive differential pressure between fluid system portions A and B being removed, however, the valve 10 may be reopened by temporarily shutting off fluid flow through the port 49, whereupon the second coil spring 46 acts to move the valve member 31 back to its centered position shown in FIG. 1. As will be apparent to those in the art, operation of the valve 10 to shut off fluid flow upon the occurrence of a differential pressure from a loss of pressure in system portion A with respect to that in system portion B causes the valve member 31 to move to the left from its third positional range, through its second and into its first range, in the same manner as has been described above with respect to rightward movement. Upon the valve member 31 entering its second positional range, fluid within the first, annular chamber portion 35 is permitted to drain through the first axial bore 59, the passageway 64, and the drainage opening 55.

It will thus be seen that the first and second springs 45, 46 and the third and fourth, piston face areas 47, 48, in cooperation with the first and second disc members 41, 42 and the first and second, tubular bushings 25, 26, comprise a first means, responsive to differential pressure between the third and fourth ports 51, 52, for constraining the valve member 31 within its third positional range when any difference between the pressure level within the third port 51 and that within the fourth port 52 is below the predetermined amount; for moving the valve member 31 from its third to its second positional range upon the pressure at the third port 51 falling below that in the fourth port 52 by the predetermined amount; and for moving valve member 31 from its third to its fourth positional range upon the pressure in the fourth port 52 falling below that in the third port 51 by the predetermined amount. The first, or differential pressure responsive, means also comprises means for moving the valve member 31 from its first to its third positional range and, alternatively, from its fifth to its third positional range, upon fluid flow into the valve through the first port 49 being shut off.

The first and second chamber portions 35, 37, in cooperation with the first and second, annular piston face areas 36, 38 and the valve housing 11 and in cooperation with the axial bores 59, 60, the annuli 56, 57, 58, and the restricted passageways 61, 62, 63, 64, provide a second means, employing fluid pressure, for moving the valve member 31 from its second to its first positional range upon the valve member 31 entering its second positional range, when fluid under pressure is received through the first port 49 and, alternatively, for moving the valve member from its fourth to its fifth positional range upon the valve member entering its fourth positional range. The second, fluid or hydraulic-actuated means additionally comprises means, actuated by fluid under pressure received through the first port 49, for constraining or "latching" the valve member 31 in its first positional range upon the valve member being moved to its first positional range by the second means; and, alternatively, for constraining the valve member 31 in its fifth positional range upon the valve member being moved to its fifth positional range by the second means.

Figure 4:
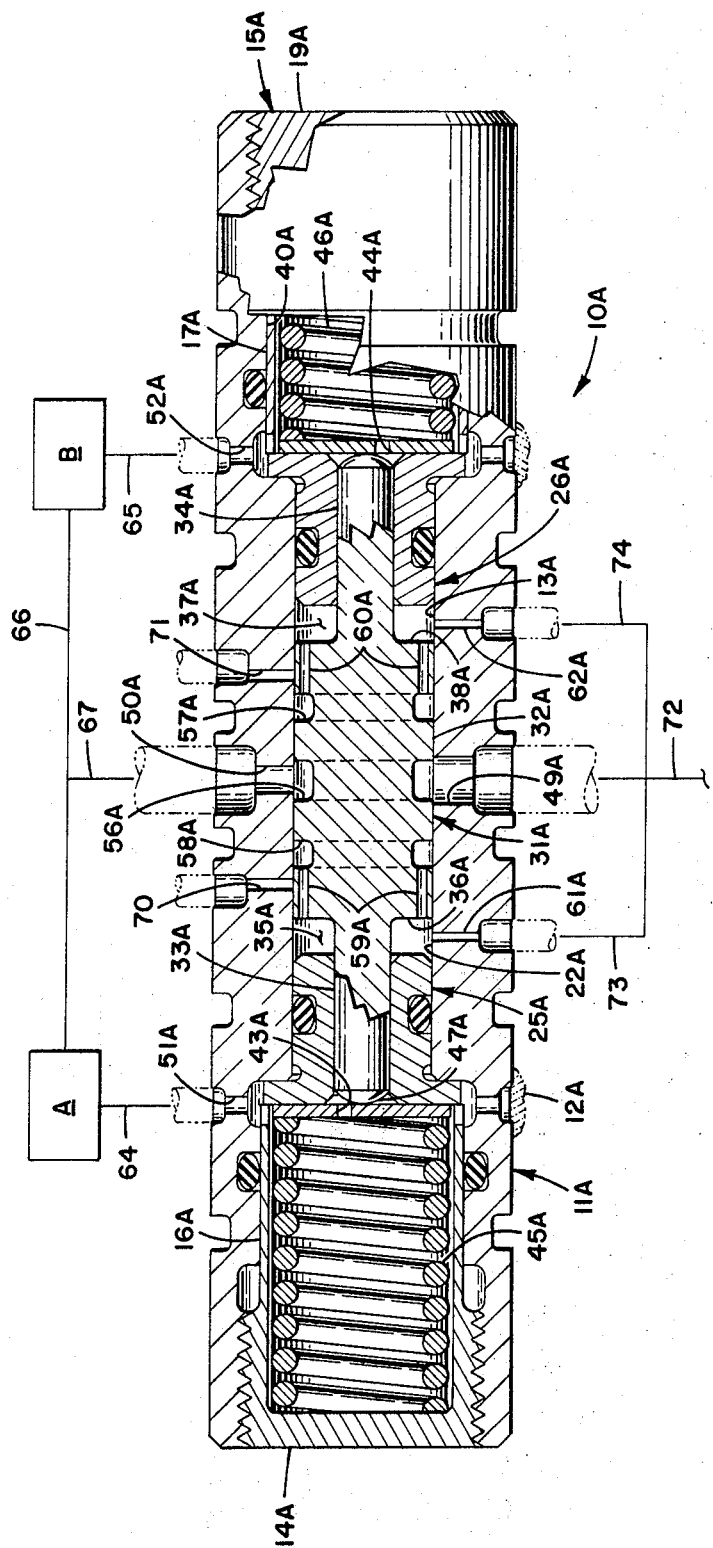
FIG. 4 is a view, similar to FIG. 1, of a modification of the valve of FIGS. 1–3.

Referring now to FIG. 4, the alternative embodiment, 10A, of the valve functions similarly to the embodiment described with respect to FIGS. 1-8, in that fluid pressure received from a supply of fluid under pressure is employed to actuate and close the valve 10A upon the occurrence of a predetermined pressure differential between third and fourth ports 51A, 52A. The components comprising the first, or differential pressure responsive means, including the springs 45A, 46A, the disc member channels 43A, 44A, and the third and fourth piston face areas 47A, 48A, are of the same configuration as the corresponding components of the embodiment of FIGS. 1-3. First and second, or inlet and outlet ports 49A, 50A extend through the housing 11A and are positioned to align with a circumferential, first annulus 56A of the valve spool 32A upon the valve member 31A being positioned within its third or central positional range. Portions of the spool 32A immediately to the left and right of the first annulus 56A are adapted to close the first, inlet port 49A upon the valve member 31A being moved to its extreme rightward or leftward positional ranges, respectively. The modification of FIG. 4 differs from that of FIGS. 1-3 in that two drain openings 70, 71 are provided. The first drain opening, 70, communicates with the valve housing chamber 13A at a location between the first bushing 25A and the second port 50A, and a second drain opening 71 communicates with the chamber 22A between the second port and the second bushing 26A. Additionally, fifth and sixth, restrictive ports 61A, 62A communicate with the first and second, chamber portions 35A, 37A, respectively, upon the valve member 31A being positioned in its third positional range. A conduit or passageway 72 has communication between the first port 49A and a source of fluid under pressure, not shown. Conduits or passageways 73 and 74 provide communication between the conduit 72 and the fifth and sixth ports 61A, 62A, respectively. As will become apparent, the fifth and sixth ports 61A, 62A perform functions which are analogous to those of the first and second restrictive passageways 61, 62, respectively, of the embodiment of FIGS. 1-3.

A second annulus 57A is formed circumferentially of the spool 32A at a location thereon spaced between the first annulus 56A and the second piston face 38A, as in the first embodiment, but a third annulus 58A is, in contrast, positioned to the left of the first annulus 56A, or between the first annulus and the first piston face area 36A. A plurality of first, axial bores 59A is provided within the valve member 31A, each bore 59A communicating between the first chamber portion 35A and the third annulus 58A. Similarly, a plurality of second, axial bores 60A is provided, each communicating between the second annulus 57A and the second chamber portion 37A. It will be noted that the first and second drain openings 70, 71 are closed, and the fifth and sixth ports 61A, 62A are open, when the valve member 31A is positioned within its central or third positional range. The fourth positional range is defined as that beginning, as the valve member 31A is moved in the second (right) direction from its centered position, when the second annulus 57A first communicates freely with the second drain opening 71 and ending when the sixth port 62A is closed by the portion of the spool 32A extending between the second annulus 57A and the second piston face 38A. The fifth positional range extends from the latter position to the extreme rightward position at which the second piston face 38A contacts the second bushing 26A. Similarly, the second positional range is defined as that beginning, when the valve member 31A is moved leftwardly from its centered position, when the third annulus 58A first communicates freely with the first drain opening 70 and ending when the fifth port 61A is closed by the spool 32A; and the first positional range comprises that beginning with the latter position and ending when the first piston face 36A contacts the first bushing 25A. Because the spool 32A includes lands to the left and right of the first annulus 56A which close the first, inlet port 49A upon the spool being in its fifth and first ranges, respectively, the valve 10A is then effective to shut off fluid flow between the first and second ports 49A, 50A. It will now be seen that the annuli 56A, 57A, and 58A, the bores 59A, 60A, the ports 49A, 50A, and the restrictive ports 61A, 62A perform functions which correspond, respectively, to those of the annuli 56, 57, 58, the bores 59, 60, the ports 49, 50, and the restrictive passageways 61, 62 of the embodiment of FIGS. 1-3. For example, upon the valve member 31A being moved rightwardly from its centered position until the second annulus 57A communicates with the second drain opening 71, the fluid pressure present within the second chamber portion 37A (because of its communication with supply passageway 72) is reduced by drainage of fluid from within chamber portion 37A through bores 60A and drainage opening 71. Fluid pressure within the first chamber portion 35A, acting upon the first piston face area 36A, is then effective to translate the valve member 31A to the right until the valve member is stopped by the second bushing 26A. It will be apparent that movement of the valve member 31A to the left, through the third and second to the first positional range, will occur in a corresponding manner upon the occurrence of a differential pressure of an opposite sense.

The restrictive ports 61A, 62A serve to prevent movement of the valve member 31A from its third positional range when transient, though substantial, differential pressures occur between the third and fourth ports 51A, 52A by imparting frictional resistance to movement of the valve member 31A within its third positional range as do the first and second passageways 61, 62 of the embodiment of FIGS. 1–3. That is, fluid must flow through the restrictive passageway 61A into the first chamber portion 35A and flow from the second chamber portion 37A through the restrictive passageway 62A when the valve member 31A is moved.

The first piston face area 36A, in cooperation with the first chamber portion 35A, additionally comprises a means actuable by fluid under pressure received through the fifth port 61A, for constraining the valve member in its fifth positional range upon the valve member 31A being moved to its fifth positional range, in that fluid under pressure is continuously supplied to the first chamber portion 35A through passageways 72, 73, and 61A so long as fluid under pressure is received through passageway 72. Similarly, the second piston face area 38A, in cooperation with the second chamber portion 37A, comprises means actuable by fluid under pressure received through the sixth port 62A for constraining the valve member 31A in its first positional range upon the valve member being moved to its first range.

With respect to both the embodiment of FIG. 4 and that of FIGS. 1–3, it will be understood by those in the art that the operating characteristics of the valve may be controlled as desired, and adapted for various applications, by appropriate design and sizing of several of its components. The configuration and size of the valve may be altered to accommodate, for example, fluid systems of high or low pressure and of high or low flow rates. Determination of the various dimensions preferred for precise operating results in a particular application necessarily entails an at least partially empirical study. As an example, however, and with reference to the embodiment of FIGS. 1–3, it has been experimentally determined that when the valve 10 is intended to receive fluid under a pressure of approximately 3,000 psi through its inlet port 49; is intended to shut off fluid flow upon the occurrence of a pressure differential of 60 percent of a maximum differential pressure of 2,250 psi available between ports 51 and 52; and wherein operation of the valve to shut off fluid flow is desired to occur within a time of about 0.036 seconds (and in which it is desired to move the valve member 36 to its second or fourth position within 0.025 seconds) following the initiation of a continuous, 60 percent pressure differential, the following design parameters are satisfactory: plungers (33, 34) of 0.163 inch diameters, spool diameter of about 0.390 inches, valve element total axial movement of 0.2 inches, and total movement, within its third positional range, of 0.064 inches, drain orifice (55) diameter of 0.017 inches, restrictive, first and second passageways (61, 62) of 0.015 inch diameters, and coiled spring 45, 46 having spring rates of about 51 pounds/inch and pre-load of 24.4 pounds. Reduction of the respective diameters of the passageways 61, 62 and/or the drain opening 55 would increase the time of response, while increasing those diameters would decrease the time of response.

It will thus be seen that the fluid monitoring and control valve 10 provides an efficient yet practicable means for shutting off fluid flow upon the occurrence of a pressure differential above a predetermined level between two fluid system portions. The valve comprises a means for continuously monitoring the difference in pressure between two segments of a fluid system and includes means for positively latching the valve in an off position (in its first or fifth position) so long as fluid under pressure is received through the first port. In addition to providing the above-stated operational advantages, the valve is of rugged, durable construction, having only one major movable part. The valve may be adapted, by modifications of its piston face area sizes, the diameters of its various restrictive orifices, and the spring rates of the springs 45, 46 for use in a wide variety of fluid system applications.

While only one embodiment of the invention, together with modifications thereof, has been described in detail herein and shown in the accompanying drawing, it will be evident that various further modifications are possible in the arrangement of its components without departing from the scope of the invention.

What is claimed is:

1. A fluid control valve of a type operable to shut off fluid flow through the valve from a source of fluid under pressure upon the occurrence of a pressure differential above a predetermined level between first and second portions of a fluid system, the valve comprising:

a valve housing having a chamber and having first, second, third, and fourth ports and at least one drain opening, the first, second, third, and fourth ports and at least one drain opening having communication with the chamber, the third and fourth ports having communication, in use, with the first and second fluid system portions;

a valve member slidably mounted within the chamber and movable therein within first, second, third, fourth, and fifth positional ranges, the valve member having a passageway which communicates between the first and second ports upon the valve member being positioned within its third positional range, the valve member having valving means for shutting off fluid flow between the first and second ports upon the valve member being positioned within its first positional range and, alternatively, upon the valve member being positioned within its fifth positional range;

first means, responsive to any differential pressure between the third and fourth ports, for constraining the valve member within its third positional range when any difference between the pressure level within the third port and that within the fourth port is below a predetermined amount, for moving the valve member from its third to its second positional range upon the pressure in the third port falling below that in the fourth port by the predetermined amount, and for moving the valve member from its third to its fourth positional range upon the pressure in the fourth port falling below that in the third port by the predetermined amount; and second means, for moving the valve member from its second to its first positional range upon the valve member entering its second positional range, and for moving the valve member from its fourth to its fifth positional range upon the valve member entering its fourth positional range.

2. The apparatus of claim 1, the first means comprising means employing fluid under pressure received through the fourth port for moving the valve member from its third to its second positional range upon the pressure level within the third port falling below that in the fourth port by the predetermined amount, and comprising means employing fluid under pressure received through the third port for moving the valve member from its third to its fourth positional range upon the pressure level within the fourth port falling below that in the third port by the predetermined amount.

3. The apparatus of claim 2, the second means additionally comprising means, actuated by fluid under pressure received through the first port, for constraining the valve member in its first positional range upon the valve member being moved to its first positional range by the second means, and alternatively, for constraining the valve member in its fifth positional range upon the valve member being moved to its fifth positional range by the second means.

4. The apparatus of claim 3, the first means including means for moving the valve member from its first to its third positional range and, alternatively, from its fifth to its third positional range, upon fluid flow into the valve through the first port being shut off.

5. The apparatus of claim 4, wherein the means for moving the valve member from its first to its third positional range and, alternatively, from its fifth to its third positional range, comprises resilient means urging the valve member toward its third positional range.

6. The apparatus of claim 1, the valve having first and second drain openings extending through the housing and additionally having fifth and sixth ports extending through the housing and adapted to communicate with a source of fluid under pressure, the apparatus further comprising means, actuable by fluid under pressure received through the sixth port, for constraining the valve member in its first positional range upon the valve member being moved to its first positional range by the second means, and means, actuable by fluid under pressure received through the fifth port, for constraining the valve member in its fifth positional range upon the valve member being moved to its fifth positional range by the second means.

7. The apparatus of claim 6, the valve member having fluid conducting means providing communication between the fifth port and the first drain opening upon the valve member being in its second, and alternatively, its first positional range, and having fluid conducting means providing communication between the sixth port and the second drain opening upon the valve member being in its fourth, and alternatively, its fifth positional range.

8. The apparatus of claim 1, the second means comprising means, actuated by fluid under pressure received through the first port, for constraining the valve member in its first positional range upon the valve member being moved to its first positional range by the second means and, alternatively, for constraining the valve member in its fifth positional range upon the valve member being moved to its fifth positional range by the second means.

9. A valve, having first, second, third, and fourth ports and at least one drain opening, for conducting fluid under pressure from the first to the second port and, alternatively, for shutting off fluid flow from the first to the second port upon the occurrence of a predetermined pressure differential between the third and fourth ports, the valve comprising:
a valve housing having an axially extending chamber, the first, second, third, and fourth ports and the at least one drain opening extending through the housing;
a valve member slideably mounted within the chamber and movable axially therein within first, second, third, fourth, and fifth positional ranges, the valve member having a passageway which communicates between the first and second ports upon the valve member being in its third positional range, the valve member having valving means for stopping fluid flow between the first and second ports upon the valve member being in its first positional range and, alternatively, upon the valve member being in its fifth positional range;
first means, responsive to differential pressure between the third and fourth ports, for constraining the valve member within its third positional range when any difference between the pressure level within the third port and that within the fourth port is below a predetermined amount, for moving the valve member from its third to its second positional range upon the pressure in the third port falling below that in the fourth port by the predetermined amount, and for moving the valve member from its third to its fourth positional range upon the pressure in the fourth port falling below that in the third port by the predetermined amount; and
second means, for moving the valve member from its second to its first positional range upon the valve member entering its second positional range, and for moving the valve member from its fourth to its fifth positional range upon the valve member entering its fourth positional range.

10. The apparatus of claim 9, the second means comprising first and second, oppositely directioned piston face areas formed on the valve member and first and second chamber portions formed within the chamber adjacent the first and second piston face areas, respectively.

11. The apparatus of claim 10, communication being provided, through the valve member, between the first and second chamber portions.

12. The apparatus of claim 10, the valve member having fluid conducting means providing communication from the first and second chamber portions to the drain opening upon the valve member being positioned within any one of the first, second, fourth, and fifth positional ranges.

13. The apparatus of claim 12, the first means including a first resilient means, mounted within the third chamber portion, for urging the valve member from its first toward its third positional range, and a second resilient means, mounted within the fourth chamber portion, for urging the valve member from its fifth toward its third positional range.

14. The apparatus of claim 13, further comprising means preventing the first resilient means from moving the valve member, in the second direction, beyond its third positional range and means preventing the second resilient means from moving the valve member, in the first direction, beyond its third positional range and toward its first and second positional ranges.

15. The apparatus of claim 10, the valve member having fluid conducting means providing communication from the first and second chamber portions to the first port, and further comprising fluid conducting means providing restricted communication between the first chamber portion and the drain opening and substantially less restricted communication between the second chamber portion and the drain opening upon the valve member being in its second position, and further comprising means providing restricted communication between the second chamber portion and the drain opening and substantially less restricted communication between the first chamber portion and the drain opening upon the valve member being in its first position.

16. The apparatus of claim 10, the first means comprising third and fourth piston face areas formed on the valve member and third and fourth chamber portions, the third chamber portion having communication with the third piston face area and with the third port and the fourth chamber portion having communication with the fourth piston face area and with the fourth port, the first and third piston face areas facing in a first axial direction and the second and fourth piston face areas facing in a second, opposite axial direction.

17. The apparatus of claim 9, means being provided for preventing movement of the valve member from the third positional range upon the occurrence of transient differential pressures between the third and fourth ports above the predetermined level but of a duration less than a predetermined time period.

18. The apparatus of claim 10, communication being provided, through the valve member, from the first port to the first and second chamber portions upon the valve member being in any position within the chamber.

* * * * *